(12) United States Patent
Duenckel et al.

(10) Patent No.: US 7,678,723 B2
(45) Date of Patent: Mar. 16, 2010

US007678723B2

(54) SINTERED SPHERICAL PELLETS

(75) Inventors: Robert Duenckel, Southlake, TX (US); Mark Edmunds, Southlake, TX (US); Steve Canova, Gray, GA (US); Benjamin Eldred, Lafayette, LA (US); Brett Allen Wilson, Lafayette, LA (US)

(73) Assignee: Carbo Ceramics, Inc., Houston, TX (US)

(*) Notice: Subject to any disclaimer, the term of this patent is extended or adjusted under 35 U.S.C. 154(b) by 0 days.

(21) Appl. No.: 12/123,189

(22) Filed: May 19, 2008

(65) Prior Publication Data

US 2008/0220996 A1 Sep. 11, 2008

Related U.S. Application Data

(62) Division of application No. 11/226,476, filed on Sep. 14, 2005, now abandoned.

(60) Provisional application No. 60/609,778, filed on Sep. 14, 2004.

(51) Int. Cl.
*C04B 35/18* (2006.01)
*C04B 35/10* (2006.01)

(52) U.S. Cl. .................. 501/127; 501/128; 501/139; 501/130; 501/131; 501/141; 501/144

(58) Field of Classification Search ......... 501/127–131, 501/141, 144
See application file for complete search history.

(56) References Cited

U.S. PATENT DOCUMENTS

| | | |
|---|---|---|
| 1,942,431 A | 1/1934 | Jung |
| 2,566,117 A | 8/1951 | Christie et al. |
| 2,699,212 A | 1/1955 | Dismukes |
| 2,799,074 A | 1/1957 | Garloni |
| 2,950,247 A | 8/1960 | McGuire, Jr. et al. |
| 2,966,457 A | 12/1960 | Starmann et al. |
| 3,026,938 A | 3/1962 | Huitt et al. |
| 3,075,581 A | 1/1963 | Kern |
| 3,079,243 A | 2/1963 | Ueltz |
| 3,126,056 A | 3/1964 | Harrell |
| 3,241,613 A | 3/1966 | Kern et al. |
| 3,242,032 A | 3/1966 | Schott |
| 3,245,866 A | 4/1966 | Schott |
| 3,347,798 A | 10/1967 | Baer et al. |
| 3,350,482 A | 10/1967 | Bowers |
| 3,399,727 A | 9/1968 | Graham et al. |
| 3,437,148 A | 4/1969 | Colpoys, Jr. |
| 3,486,706 A | 12/1969 | Weyand |
| 3,491,492 A | 1/1970 | Ueltz |
| 3,497,008 A | 2/1970 | Graham et al. |
| 3,598,373 A | 8/1971 | Inman |
| 3,690,622 A | 9/1972 | Brunner et al. |
| 3,758,318 A | 9/1973 | Farris et al. |
| 3,810,768 A | 5/1974 | Parsons et al. |
| 3,856,441 A | 12/1974 | Suzukawa et al. |
| 3,890,072 A | 6/1975 | Barks |
| 3,976,138 A | 8/1976 | Colpoys, Jr. et al. |
| 4,051,603 A | 10/1977 | Kern, Jr. |
| 4,052,794 A | 10/1977 | Ganiaris |
| 4,053,375 A | 10/1977 | Roberts et al. |
| 4,061,596 A | 12/1977 | Matsushita et al. |
| 4,068,718 A | 1/1978 | Cooke, Jr. et al. |
| 4,072,193 A | 2/1978 | Sarda et al. |
| 4,077,908 A | 3/1978 | Stenzel et al. |
| 4,104,342 A | 8/1978 | Wessel et al. |
| 4,113,660 A | 9/1978 | Abe et al. |
| 4,140,773 A | 2/1979 | Stowell et al. |
| 4,166,147 A | 8/1979 | Lange et al. |
| 4,195,010 A | 3/1980 | Russell et al. |
| 4,268,311 A | 5/1981 | VerDow |
| 4,296,051 A | 10/1981 | Shimamura et al. |
| 4,303,204 A | 12/1981 | Weston |
| 4,343,751 A | 8/1982 | Kumar |
| 4,371,481 A | 2/1983 | Pollock |
| 4,396,595 A | 8/1983 | Heytmeijer et al. |
| 4,407,967 A | 10/1983 | Luks |
| 4,427,068 A | 1/1984 | Fitzgibbon |
| 4,439,489 A | 3/1984 | Johnson et al. |
| 4,440,866 A | 4/1984 | Lunghofer et al. |
| 4,442,897 A | 4/1984 | Crowell |
| 4,450,184 A | 5/1984 | Longo et al. |
| 4,462,466 A | 7/1984 | Kacknik |
| 4,493,875 A | 1/1985 | Beck et al. |
| 4,521,475 A | 6/1985 | Riccio et al. |

(Continued)

FOREIGN PATENT DOCUMENTS

AR 241543 8/1992

(Continued)

OTHER PUBLICATIONS

U.S. Appl. No. 60/407,734, Stephenson et al.

(Continued)

*Primary Examiner*—Karl E Group
(74) *Attorney, Agent, or Firm*—Haynes and Boone, LLP

(57) ABSTRACT

Sintered, spherical composite pellets or particles comprising alumina fines, at least one of clay and bauxite and optionally a sintering aid, are described, along with a process for their manufacture. The use of such pellets in hydraulic fracturing of subterranean formations and in grinding is also described.

15 Claims, No Drawings

U.S. PATENT DOCUMENTS

| | | | |
|---|---|---|---|
| 4,522,731 A | 6/1985 | Lunghofer |
| 4,547,468 A | 10/1985 | Jones et al. |
| 4,555,493 A | 11/1985 | Watson et al. |
| 4,618,504 A | 10/1986 | Bosna et al. |
| 4,623,630 A | 11/1986 | Fitzgibbon |
| 4,632,876 A | 12/1986 | Laird et al. |
| 4,639,427 A | 1/1987 | Khaund |
| 4,652,411 A | 3/1987 | Swarr et al. |
| 4,654,266 A | 3/1987 | Kachnik |
| 4,658,899 A | 4/1987 | Fitzgibbon |
| 4,668,645 A | 5/1987 | Khaund |
| 4,680,230 A | 7/1987 | Gibb et al. |
| 4,713,203 A | 12/1987 | Andrews |
| 4,714,623 A | 12/1987 | Riccio et al. |
| 4,732,920 A | 3/1988 | Graham et al. |
| 4,744,831 A | 5/1988 | Beck |
| 4,840,729 A | 6/1989 | Levine |
| 4,879,181 A | 11/1989 | Fitzgibbon |
| 4,894,189 A | 1/1990 | Dave et al. |
| 4,894,285 A | 1/1990 | Fitzgibbon |
| 4,911,987 A | 3/1990 | Sakata et al. |
| 4,921,820 A | 5/1990 | Rumpf et al. |
| 4,921,821 A | 5/1990 | Rumpf et al. |
| 4,993,491 A | 2/1991 | Palmer et al. |
| 5,030,603 A | 7/1991 | Rumpf et al. |
| 5,120,455 A | 6/1992 | Lunghofer |
| 5,175,133 A | 12/1992 | Smith et al. |
| 5,188,175 A | 2/1993 | Sweet |
| 5,266,243 A | 11/1993 | Kneller et al. |
| 5,422,183 A | 6/1995 | Sinclair et al. |
| 5,443,633 A | 8/1995 | Hirsbrunner et al. |
| 5,597,784 A | 1/1997 | Sinclair et al. |
| 5,649,596 A | 7/1997 | Jones et al. |
| 5,654,246 A | 8/1997 | Newkirk et al. |
| 5,964,291 A | 10/1999 | Bourne et al. |
| 5,972,835 A | 10/1999 | Gupta |
| 5,993,988 A | 11/1999 | Ohara et al. |
| 6,059,034 A | 5/2000 | Rickards et al. |
| 6,074,754 A | 6/2000 | Jacobsen et al. |
| 6,080,232 A | 6/2000 | Sperlich et al. |
| 6,123,965 A | 9/2000 | Jacob et al. |
| 6,217,646 B1 | 4/2001 | Gervais |
| 6,319,870 B1 | 11/2001 | Beall et al. |
| 6,330,916 B1 | 12/2001 | Rickards et al. |
| 6,364,018 B1 | 4/2002 | Brannon et al. |
| 6,372,678 B1 | 4/2002 | Youngman et al. |
| 6,503,676 B2 | 1/2003 | Yamashita et al. |
| 6,528,157 B1 | 3/2003 | Hussain et al. |
| 6,632,527 B1 | 10/2003 | McDaniel et al. |
| 6,725,930 B2 | 4/2004 | Boney et al. |
| 6,743,269 B2 | 6/2004 | Meyer et al. |
| 6,749,025 B1 | 6/2004 | Brannon et al. |
| 6,753,299 B2 | 6/2004 | Lunghofer et al. |
| 6,766,817 B2 | 7/2004 | da Silva |
| 6,772,838 B2 | 8/2004 | Dawson et al. |
| 6,780,804 B2 | 8/2004 | Webber et al. |
| 6,918,404 B2 | 7/2005 | Dias da Silva |
| 7,021,379 B2 | 4/2006 | Nguyen |
| 7,036,591 B2 | 5/2006 | Cannan et al. |
| 7,041,250 B2 | 5/2006 | Sherman et al. |
| 7,066,586 B2 | 6/2006 | da Silva |
| 7,135,231 B1 | 11/2006 | Sinclair et al. |
| 7,244,398 B2 | 7/2007 | Kotary et al. |
| 7,270,879 B2 | 9/2007 | McCrary |
| 7,285,255 B2 | 10/2007 | Kadlec et al. |
| 7,387,752 B2 | 6/2008 | Canova et al. |
| 2002/0048676 A1 | 4/2002 | McDaniel et al. |
| 2004/0023818 A1 | 2/2004 | Nguyen et al. |
| 2004/0040708 A1 | 3/2004 | Stephenson et al. |
| 2004/0200617 A1 | 10/2004 | Stephenson et al. |
| 2005/0028976 A1 | 2/2005 | Nguyen |
| 2005/0028979 A1 | 2/2005 | Brannon et al. |
| 2005/0077044 A1 | 4/2005 | Qu et al. |
| 2005/0244641 A1 | 11/2005 | Vincent |
| 2006/0006589 A1 | 1/2006 | Canova et al. |
| 2006/0078682 A1 | 4/2006 | McDaniel et al. |
| 2006/0081371 A1 | 4/2006 | Duenckel et al. |
| 2006/0135809 A1 | 6/2006 | Kimmich et al. |
| 2006/0147369 A1 | 7/2006 | Bi et al. |
| 2006/0162929 A1 | 7/2006 | Urbanek |
| 2006/0175059 A1 | 8/2006 | Sinclair et al. |
| 2006/0219600 A1 | 10/2006 | Palamara et al. |
| 2007/0023187 A1 | 2/2007 | Canova et al. |
| 2007/0212281 A1 | 9/2007 | Kadlec et al. |
| 2008/0015103 A1 | 1/2008 | Luscher et al. |
| 2008/0015531 A1 | 1/2008 | Hird et al. |
| 2008/0058228 A1 | 3/2008 | Wilson |
| 2008/0220996 A1 | 9/2008 | Duenckel et al. |
| 2008/0241540 A1 | 10/2008 | Canova et al. |
| 2009/0008093 A1 | 1/2009 | Duenckel |
| 2009/0118145 A1 | 5/2009 | Wilson et al. |

FOREIGN PATENT DOCUMENTS

| | | | |
|---|---|---|---|
| AR | 243222 | | 7/1993 |
| AU | 551409 | | 1/1983 |
| CA | 1045027 | | 12/1978 |
| CA | 1117987 | | 2/1982 |
| CA | 1172837 | | 8/1984 |
| CA | 1191020 | | 7/1985 |
| CA | 1194685 | | 10/1985 |
| CA | 1232751 | | 2/1988 |
| CA | 2018584 | | 6/1990 |
| CA | 2444826 | | 4/2004 |
| CH | 647689 | | 2/1985 |
| DE | 2948584 | | 6/1980 |
| DK | 168099 | | 7/1983 |
| EA | 006953 | | 6/2006 |
| EA | 007864 | | 2/2007 |
| EA | 008825 | | 8/2007 |
| EA | 010944 | | 12/2008 |
| EP | 0083974 | | 7/1983 |
| EP | 0087852 | | 9/1983 |
| EP | 0101855 | | 3/1984 |
| EP | 0116369 | | 8/1984 |
| EP | 0169412 | | 1/1986 |
| EP | 402686 | * | 12/1990 |
| FR | 2486930 | | 1/1982 |
| GB | 578424 | | 7/1946 |
| GB | 715354 | | 9/1954 |
| GB | 715882 | | 9/1954 |
| GB | 886342 | | 1/1962 |
| GB | 992237 | | 5/1965 |
| GB | 1033143 | | 6/1966 |
| GB | 1411135 | | 10/1975 |
| GB | 1421531 | | 1/1976 |
| GB | 2037727 | | 7/1980 |
| GB | 2079261 | | 1/1982 |
| GB | 2092561 | | 10/1983 |
| MX | 161299 | | 9/1990 |
| PH | 18450 | | 7/1985 |
| RU | 2014281 | | 6/1994 |
| RU | 2079471 | | 5/1997 |
| RU | 2083528 | | 7/1997 |
| RU | 2090537 | | 9/1997 |
| RU | 2098387 | | 12/1997 |
| RU | 2098618 | | 12/1997 |
| RU | 2107674 | | 3/1998 |
| RU | 2112189 | | 5/1998 |
| RU | 2112761 | | 6/1998 |
| RU | 2121988 | | 11/1998 |
| RU | 2129985 | | 5/1999 |
| RU | 2129987 | | 5/1999 |
| RU | 2133716 | | 7/1999 |

| | | |
|---|---|---|
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030 | 11/2003 |
| RU | 2002117351 | 1/2004 |
| RU | 2229456 | 5/2004 |
| RU | 2229458 | 5/2004 |
| VE | 49128 | 4/1993 |
| WO | WO 2005/100007 | 10/2005 |
| WO | WO 2006/010036 | 1/2006 |
| WO | WO 2006/032008 | 3/2006 |
| WO | WO 2006/094074 | 9/2006 |
| WO | WO 2007/016268 | 2/2007 |
| WO | WO 2008/008828 | 1/2008 |
| WO | WO 2008/028074 | 3/2008 |
| WO | WO 2009/009370 | 1/2009 |

OTHER PUBLICATIONS

U.S. Appl. No. 60/428,836, Stephenson et al.
U.S. Appl. No. 60/569,067, Brannon et al.
Office Action issued by the U.S. Patent and Trademark Office on Mar. 19, 2004, in connection with U.S. Appl. No. 10/268,169.
Office Action issued by the U.S. Patent and Trademark Office on Mar. 1, 2006, in connection with U.S. Appl. No. 11/103,777.
International Search Report issued by the ISA/US on Mar. 14, 2006 in connection with International Application No. PCT/US05/12256.
Written Opinion of the International Searching Authority issued by the ISA/US on Mar. 14, 2006 in connection with International Application No. PCT/US05/12256.
Determining Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.
Light Weight Proppants for Deep Gas Well Stimulation, $2^{nd}$ Annual Report, Jul. 01, 1980-Jun. 30, 1981, published Apr. 1982, DOE Contract AC19-79BC10038, by R.A. Cutler et al, Terra Tek, Inc.
Oxide Ceramic Proppants for Treatment of Deep Well Fractures, SPE 6816, by E.A. Neel, J.L. Parmley, and P.J. Colpoys, Jr. (1977).
Hydraulic Fracturing with a High-Strength Proppant, Claude E. Cooke, Society of Petroleum Engineers of AIME, SPE 6213, 1976.
The Effect of Various Proppants and Proppant Mixtures on Fracture Permeability, Robert R. McDaniel, et al., SPE 7573, 1978.
UCAR Ceramic Props, The Ideal Proppant for Deep Wells and High Compaction Pressures.
DOE Progress Review No. 21 for reporting period Oct. 1-Dec. 31, 1979, Determining Feasibility of Fabricating Light Weight Proppants for Application in Gas and Oil Well Stimulation.
DOE Progress Review No. 22 for reporting period Jan. 1-Mar. 31, 1980, Determining Feasibility of Fabricating Light Weight Proppants for Application in Gas and Oil Well Stimulation.
DOE Progress Review No. 23 for reporting period Apr. 1-Jun. 30, 1980, Determining Feasibility of Fabricating Light Weight Proppants for Application in Gas and Oil Well Stimulation.
DOE Progress Review No. 24 for reporting period Jul. 1-Sept. 31, 1980, Determining Feasibility of Fabricating Light Weight Proppants for Application in Gas and Oil Well Stimulation.
DOE Progress Review No. 26 for reporting period Jan. 1-Mar. 31, 1981, Determine Feasibility of Fabricated Light Weight Proppants for Application in Gas and Oil Well Stimulation.
DOE Progress Review No. 27 for reporting period Apr. 1-Jun. 30, 1981, Determining Feasibility of Fabricating Light Weight Proppants for Application in Gas and Oil Well Stimulation.
Determining Feasibility of Fabricating Light Weight Proppants for Application in Gas and Oil Well Stimulation, Progress Report 2, Doe Contract De-AC19-79BC10038, Submitted by Terra Tek, Inc., TR 79-77, Oct. 1979.
Light Weight Proppants for Deep Gas Well Stimulation, A. H. Jones et al, Terra Tek, Inc., Jun. 1980, TR Report 80-47.
New Proppants for Deep Gas Well Stimulation, SPE 9869, by Raymond A. Cutler, et al., 1977.
Effect of Grinding and Firing Treatment on the Crystalline and Glass Content and the Physical Properties of Whiteware Bodies; S. C. Sane, et al., 1951.
Nepheline Syenite-Talc Mixtures as a Flux in Low-Temperature Vitrified Bodies; E. D. Lynch, et al., Apr. 1950.
Engineering Properties of Ceramics, Databook to Guide Materials Selection for Structural Applications, J. F. Lynch, et al., TR 66-52, Jun. 1966.
Reactions in Silica-Alumina Mixtures, Richard R. West, et al., Apr. 1958.
Synthesis and Mechanical Properties of Stoichiometric Aluminum Silicate (Mullite), K. S. Mazdiyasni, et al., Dec. 1972.
Coors Porcelain Company letter to Halliburton Services, Inc. dated Aug. 4, 1978 with Proposal to Supply Proppant.
Coors Porcelain Company letter to B. J. Hughes, Inc. dated Aug. 24, 1978 with Proposal to Supply Proppant.
Unimin Brochure, Unimin Canada Ltd., Mar. 1991.
Role of Impurities on Formation of Mullite from Kaolinite and $Al_2O_3$-$S_iO_2$ Mixtures, Johnson, Sylvia M. et al., Ceramic Bulletin, vol. 61, No. 8 (1982), pp. 838-842.
Bauxite and Alumina, Luke H. Baumgardner, et al., Minerals Yearbook, 1987, vol. I.
The Industrial Uses of Bauxite, N. V. S. Knibbs, D.Sc., 1928.
Bauxite, Cyril S. Fox, 1927.
Pages from the National Atlas of the United States of America.
Document entitled "Feb., Mar., Apr. 1998: Commercial Activity", with Exhibits A-D.
Document entitled "Jul. 1998: Commercial Activity", with Exhibit E.
Document entitled "Sep. 2001: Commercial Activity", with Exhibit F.
ScalePROP brochure, Schlumberger, Jan. 2002.
Rickards, A. R., et al.; "High Strength, Ultra Lightweight Proppant Development Lends New Dimensions to Hydraulic Fracturing Applications", SPE 84308, Oct. 7, 2003.
Didion International, Inc.; Mold & Core Consumables; http://www.moderncasting.com/MoreInfo/0602/FMI_Article_08.asp; Dec. 27, 2002.
Itochu Ceratech Corp.; Ceramics and Minerals Department; http://www.itc-cera.co.jp/english/cera.htm; Jun. 8, 2002.
Enprotech Corp; About Enprotech; http:www.enprotech.com/aboutus.html; Copyright 2004.
Spraying Systems Co.; Air Atomizing Nozzles 1/2J Pressure Spray Set-ups Internal Mix; Air Atomizing Nozzles 1/2J Series External Mix Set-ups; Air Atomizing Nozzles 1/2J Siphon/Gravity-Fed Spray Set-ups; pp. 358-362; Copyright 2003.
Spraying Systems Co.; Air Atomizing Nozzles 1/8J and 1/4J Set-ups External Mix; pp. 282-285; Copyright 2003.

Spraying Systems Co.; Air Atomizing Nozzles Basic Information; pp. 268-269; Copyright 2003.
Spraying Systems Co.; Engineer's Guide to Spray Technology; Copyright 2000.
Environmental Conservation-Oriented Businesses; Itochu Corporation; pp. 11-16; Jul. 2004.
ltochu Ceratech Corporation; Cerabeads—Spherical Ceramic Sand; http://exhibits.gifa.de/exh/GMTN2003/e/3231240; Mar. 13, 2005.
Naigai Ceramics Co., Ltd.; Naigai Cerabeads 60; Aug. 1986.
Office Action issued by the U.S. Patent and Trademark Office on Feb. 7, 2007, in connection with U.S. Appl. No. 11/192,711.
Office Action issued by the U.S. Patent and Trademark Office on Jul. 13, 2007, in connection with U.S. Appl. No. 11/192,711.
Office Action issued by the U.S. Patent and Trademark Office on Nov. 15, 2007, in connection with U.S. Appl. No. 11/192,711.
Office Action issued by the U.S. Patent and Trademark Office on Feb. 20, 2008, in connection with U.S. Appl. No. 11/226,476.
Written Opinion of the International Searching Authority issued Jun. 8, 2007 in connection with International Application No. PCT/US2006/029234.
"rock." Encyclopedia Britannica. 2007. Encyclopedia Britannica Online. Jun. 27, 2007 http://www.search.eb.com/eb/article-80183.
Chemical Abstracts, vol. 85, No. 24, Dec. 13, 1976.
Perry's Chemical Engineers' Handbook Section 12, 7th Edition, 1997, pp. 12-81 to 12-90.
Office Action mailed Jan. 21, 1992, by the USPTO regarding U.S. Appl. No. 07/769,584.
Notice of Allowance mailed Sep. 1, 1992, by the USPTO regarding U.S. Appl. No. 07/769,584.
Notice of Allowance mailed Jan. 7, 2005, by the USPTO regarding U.S. Appl. No. 10/268,169.
Notice of Allowance mailed Dec. 28, 2005, by the USPTO regarding U.S. Appl. No. 10/268,169.
Office Action mailed Sep. 7, 2006, by the USPTO regarding U.S. Appl. No. 11/103,777.
Advisory Action mailed Nov. 27, 2006, by the USPTO regarding U.S. Appl. No. 11/103,777.
Office Action mailed Feb. 27, 2007, by the USPTO regarding U.S. Appl. No. 11/103,777.
Office Action mailed Aug. 15, 2006, by the USPTO regarding U.S. Appl. No. 11/178,081.
Office Action mailed Jan. 30, 2007, by the USPTO regarding U.S. Appl. No. 11/178,081.
Advisory Action mailed Apr. 11, 2007, by the USPTO regarding U.S. Appl. No. 11/178,081.
Office Action mailed May 16, 2007, by the USPTO regarding U.S. Appl. No. 11/178,081.
Notice of Allowance mailed Feb. 5, 2008, by the USPTO regarding U.S. Appl. No. 11/178,081.
Office Action mailed Aug. 16, 2007, by the USPTO regarding U.S. Appl. No. 11/226,476.
Office Action mailed Jul. 24, 2008, by the USPTO regarding U.S. Appl. No. 11/365,230.
Office Action mailed Oct. 2, 2008, by the USPTO regarding U.S. Appl. No. 11/365,230.
Office Action mailed Mar. 19, 2009, by the USPTO regarding U.S. Appl. No. 11/365,230.
Notice of Allowance mailed Jun. 26, 2009, by the USPTO regarding U.S. Appl. No. 11/365,230.
Office Action mailed Sep. 5, 2008, by the USPTO regarding U.S. Appl. No. 12/032,301.
Office Action mailed Feb. 17, 2009, by the USPTO regarding U.S. Appl. No. 12/032,301.
Office Action mailed Aug. 11, 2009, by the USPTO regarding U.S. Appl. No. 12/032,301.
Office Action mailed May 28, 2009, by the USPTO regarding U.S. Appl. No. 12/166,504.
International Search Report mailed Aug. 29, 2006, by the ISA/US regarding International Application No. PCT/US2005/024339.
Written Opinion mailed Aug. 29, 2006, by the ISA/US regarding International Application No. PCT/US2005/024339.
International Preliminary Report on Patentability mailed Jan. 18, 2007, by the IB regarding International Application No. PCT/US2005/024339.
International Search Report mailed Oct. 4, 2006, by the ISA/US regarding International Application No. PCT/US2005/033092.
Written Opinion mailed Oct. 4, 2006, by the ISA/US regarding International Application No. PCT/US2005/033092.
International Preliminary Report on Patentability mailed Apr. 20, 2007, regarding International Application No. PCT/US2005/033092.
International Search Report mailed Jul. 13, 2007, by the ISA/US regarding International Application No. PCT/US2006/007308.
Written Opinion mailed Jul. 13, 2007, by the ISA/US regarding International Application No. PCT/US2006/007308.
International Preliminary Report on Patentability mailed Sep. 20, 2007, by the IB regarding International Application No. PCT/US2006/007308.
International Search Report mailed Jun. 8, 2007, by the ISA/US regarding International Application No. PCT/US2006/029234.
Written Opinion mailed Jun. 8, 2007, by the ISA/US regarding International Application No. PCT/US2006/029234.
International Preliminary Report on Patentability mailed Feb. 7, 2008, by the IB regarding International Application No. PCT/US2006/029234.
International Search Report mailed Dec. 27, 2007, by the ISA/US regarding International Application No. PCT/US2007/073247.
Written Opinion mailed Dec. 27, 2007, by the ISA/US regarding International Application No. PCT/US2007/073247.
International Preliminary Report on Patentability mailed Jan. 13, 2009, by the IB regarding International Application No. PCT/US2007/073247.
International Search Report mailed Feb. 22, 2008, by the ISA/US regarding International Application No. PCT/US2007/077290.
Written Opinion mailed Feb. 22, 2008, by the ISA/US regarding International Application No. PCT/US2007/077290.
International Preliminary Examination Report mailed Feb. 20, 2009, by the IB regarding International Application No. PCT/US2007/077290.
Written Opinion mailed Oct. 6, 2008, by the ISA/US regarding International Application No. PCT/US2008/069012.
International Preliminary Examination Report mailed Oct. 6, 2008, by the IB regarding International Application No. PCT/US2008/069012.
Correspondence from foreign counsel dated Nov. 29, 2007, regarding Office Action issued in connection with Eurasian Patent Application No. 200700296.
Correspondence from foreign counsel dated Feb. 29, 2008, regarding Office Action issued in connection with Eurasian Patent Application No. 200700583.
Correspondence from foreign counsel dated May 9, 2008, regarding Office Action issued in connection with Eurasian Patent Application No. 200700583.
Correspondence from foreign counsel dated Sep. 15, 2008, regarding Office Action issued in connection with Eurasian Patent Application No. 200700583.
Correspondence from foreign counsel dated Jul. 10, 2008, regarding Office Action issued in connection with Eurasian Patent Application No. 200701830.
Correspondence from foreign counsel dated Aug. 25, 2008, regarding Office Action issued in connection with Eurasian Patent Application No. 200800008.
Office Action issued Jun. 12, 2008, by the State Intellectual Property Office, P.R. China, regarding GCC Patent Application No. GCC/P/2005/4586.
Office Action issued Jun. 19, 2009, by the State Intellectual Property Office, P.R. China, regarding Chinese Patent Application No. 200580030660.3.
Office Action issued Aug. 21, 2009, by the State Intellectual Property Office, P.R. China, regarding Chinese Patent Application No. 200680038963.4.

* cited by examiner

SINTERED SPHERICAL PELLETS

CROSS-REFERENCE TO RELATED APPLICATIONS

This patent application is a divisional of U.S. patent application Ser. No. 11/226,476, filed Sep. 14, 2005, now abandoned which claims benefit of provisional Application No. 60/609,778, filed on Sep. 14, 2004, which are incorporated by reference herein in its entirety.

BACKGROUND OF THE INVENTION

The present invention relates to oil and gas well proppants and, more particularly, to proppants with excellent crush resistance in a broad range of applications in which one of the starting raw materials used to produce the proppant is alumina fines.

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic pellets, which are carried into the fracture by means of a fluid.

Spherical particles of uniform size are generally acknowledged to be the most effective proppants due to maximized permeability. For this reason, assuming other properties to be equal, spherical or essentially spherical proppants, such as rounded sand grains, metallic shot, glass beads, tabular alumina, or other ceramic raw materials mechanically processed into spheres are preferred.

DETAILED DESCRIPTION

In accord with the present invention, spherical pellets or particles, having alumina fines as one of the starting raw materials, are produced. The spherical particles are useful as oil and gas proppants as well as grinding media. The spherical particles may be fired at a sintering temperature for a period of time sufficient to enable recovery of sintered, spherical pellets having an apparent specific gravity of between 2.70 and 3.75 and a bulk density of from about 1.35 to about 2.15 g/cm$^3$. The proppants of the present embodiments range from intermediate to exceptionally high strength and are effective at closure stresses of up to about 15,000 psi. Thus, the proppants of the present embodiments are generally applicable for moderate to very deep oil and gas wells where closure stresses may be extreme.

The spherical pellets are made from a composition of alumina fines, and at least one of clay and bauxite. In addition, sintering aids may be added to the compositions. Suitable sintering aids include iron oxide and zinc oxide. The composition may include from about 10 to 75 percent by weight of alumina fines, from about 20 to 90 percent by weight of at least one of clay and bauxite and, optionally, from about 0.1 to 15 percent by weight of a sintering aid. The clay and bauxite may have an alumina content ranging from about 35 to 90 percent by weight of alumina. In one embodiment, the composition includes 58 percent by weight of alumina fines and 42 percent by weight of calcined kaolin. In another embodiment, the composition includes 64 percent by weight of alumina fines, 28 percent by weight of kaolin and 8 percent by weight of iron oxide. In yet another embodiment, the composition includes 20 percent by weight of alumina fines and 80 percent by weight of bauxite. In a still further embodiment, the composition includes 36 percent by weight of alumina fines, 63 percent by weight of bauxite and 1 percent by weight of zinc oxide.

A suitable alumina fines material for use in the compositions for producing the proppant of the present embodiments is the alumina fines dust collector by-product of alumina purification using the Bayer process. According to the Bayer process, the aluminum component of bauxite ore is dissolved in sodium hydroxide, impurities are removed from the solution and alumina trihydrate is precipitated from the solution and then calcined to aluminum oxide. A Bayer Process plant is essentially a device for heating and cooling a large recirculating stream of caustic soda solution. Bauxite is added at the high temperature point, red mud is separated at an intermediate temperature, and alumina is precipitated at the low temperature point in the cycle. The alumina fines that are useful for the preparation of the proppant pellets according to the present embodiments are a by-product this process. A suitable alumina fines product has an alumina content of about 99 percent by weight, a loss on ignition of about 13%-22%, an average particle size of about 12 microns and about 86% or more of the particle size distribution is less than 45 microns. The term "loss on ignition" refers to a process, well known to those of ordinary skill in the art, in which samples are dried at about 100° C. to drive off free moisture and then heated to about 1000° C. to drive off chemically bound water and other compounds.

The compositions for producing the proppant of the present embodiments also include at least one of clay and bauxite. A suitable clay material for use in the compositions for producing the proppant of the present embodiments is kaolin. Kaolin as found in nature, is a hydrated aluminosilicate having a composition of approximately 52% $SiO_2$, and 45% $Al_2O_3$ (chemistry is in weight percent on a calcined basis). A suitable kaolin clay is mined in the McIntyre, Georgia area and has a loss on ignition of approximately 14%. According to certain embodiments, the kaolin clay material may be calcined by methods well known to those of ordinary skill in the art, at temperatures and times to remove sufficient water of hydration to facilitate pelletization.

A suitable bauxite material for use in the compositions for producing the proppant of the present embodiments is available from Comalco. This bauxite as found in nature has a chemical composition of approximately 82% $Al_2O_3$, 7% $SiO_2$ (chemistry is in weight percent on a calcined basis). The bauxite is mined and calcined in Australia and as received has a loss on ignition of approximately less than 1%. According to certain embodiments, the bauxite material may be calcined by methods well known to those of ordinary skill in the art, at temperatures and times to remove sufficient water of hydration to facilitate pelletization.

The clay and bauxite materials for use in the compositions for producing the proppant of the present embodiments are compatible with, and may be used as a matrix for, a wide variety of proppant materials, and, in this manner, a wide variety of composite proppants may be produced, which may be customized to particular conditions or formations. Thus, the properties of the final sintered composite pellets, such as strength, permeability, apparent specific gravity, bulk density and acid resistance, may be controlled through variations in the initial component mixture.

Further the spherical pellets may be customized for use as a grinding media. For instance, the desired color and density of the grinding media can be achieved by the appropriate selection of the starting materials and in particular the specific sintering aid. A light colored media is often a requirement for grinding media so that wear of the media during grinding will not discolor the product being milled. In this case, a sintering aid such as iron oxide would not be used since iron oxide tends to darken the media. Instead, a sintering aid such as zinc oxide may be used since it results in a light colored media. A desired density of the grinding media can be achieved by adjusting the relative ratios of the starting materials. For instance, ratios of starting ingredients that contain higher amounts of alumina fines or bauxites will result in a higher density media. Higher density grinding media improves milling in ball mills and vertical mills. The properties appropriate for grinding media such as abrasion resistance are well known to those of ordinary skill in the art.

The term "apparent specific gravity," as used herein, is a number without units, but is defined to be numerically equal to the weight in grams per cubic centimeter of volume, excluding void space or open porosity in determining the volume. The apparent specific gravity values given herein were determined by water displacement.

The term "bulk density", as used herein, is defined to mean the weight per unit volume, including in the volume considered the void spaces between the particles.

Unless stated otherwise, all percentages, proportions and values with respect to composition are expressed in terms of weight.

As noted above, the compositions for producing the proppant of the present embodiments may also include sintering aids such as iron oxide or zinc oxide. The iron oxide may be added to the composition as hematite iron oxide ($Fe_2O_3$) or other forms of iron oxide, such as FeO and $Fe_3O_4$, and thus the term "iron oxide" as used herein means all forms of iron oxide and may be generically represented as $Fe_xO_y$. A suitable iron oxide material is pigment grade iron oxide which is commercially available from Densimix, Inc. A suitable zinc oxide material is commercially available from U.S. Zinc.

The present invention also provides a process for propping fractures in oil and gas wells at depths of up to 20,000 feet utilizing the proppant of the present embodiments by mixing the proppant with a fluid, such as oil or water, and introducing the mixture into a fracture in a subterranean formation. The compaction pressure upon the fracture generally is up to about 15,000 psi.

In a method of the present embodiments, the composition of alumina fines, at least one of clay and bauxite and optionally one or more sintering aids is ground into a fine particle size dust. This dust mixture is added to a high intensity mixer having a rotatable table provided with a rotatable impacting impeller, such as described in U.S. Pat. No. 3,690,622, to Brunner. Sufficient water is added to cause essentially spherical ceramic pellets to form. Optionally, a binder, for example, various resins or waxes, starch, or polyvinyl alcohol known in the prior art, may be added to the initial mixture to improve pelletizing and to increase the green strength of the unsintered pellets. A suitable binder is starch which may be added at levels of from about 0 to 1.5 percent by weight. In certain embodiments, the starch may be added at an amount of from about 0.5 to 0.7 percent by weight.

The resulting pellets are then dried and screened to an appropriate pre-sintering size, and fired at sintering temperature until an apparent specific gravity between about 2.70 and about 3.75 is obtained, depending on the composition of the starting mixture.

Those of ordinary skill in the art will recognize that the composition may also include other conventional sintering aids including, for example, minor amounts of bentonite clay, feldspar, nepheline syenite, talc, titanium oxide, and compounds of lithium, sodium, magnesium, potassium, calcium, manganese and boron, such as lithium carbonate, sodium oxide, sodium carbonate, sodium silicates, magnesium oxide, magnesium carbonate, calcium oxide, calcium carbonate, manganese oxide, boric acid, boron carbide, aluminum diboride, boron nitride and boron phosphide. The most desirable range of sintering aid can be readily determined by those skilled in the art, depending upon the particular mixture of alumina fines, clay and bauxite used.

The sintered proppant pellets of the present embodiments are spherical in shape. The sphericity of the proppant pellets was determined using a visual comparator. Krumbein and Sloss, Stratigraphy and Sedimentation, second edition, 1955, W.H. Freeman & Co., San Francisco, Calif., describe a chart for use in visual determination of sphericity and roundness. Visual comparison using this chart is a widely used method of evaluating sphericity or roundness of particles. In using the visual comparison method, a random sample of 20 particles of the material to be tested is selected. The particles are viewed under a 10 to 20 power microscope or a photomicrograph and their shapes compared to the Krumbein and Sloss chart. The chart values for sphericity range from 0.3 to 0.9. The chart values for the individual particles are then averaged to obtain a sphericity value.

The term "spherical" and related forms, as used herein, is defined to mean an average ratio of minimum diameter to maximum diameter of about 0.80 or greater, or having an average sphericity value of about 0.8 or greater compared to a Krumbein and Sloss chart. The sintered proppant pellets of the present embodiment have an average sphericity of about 0.8 or greater when visually compared with the Krumbein and Sloss chart. The proppant pellets of certain of the present embodiments have a roundness of about 0.9 and a sphericity of about 0.9.

A suitable procedure for producing the sintered, spherical pellets of the present embodiment is as follows:

1. The starting ingredients of alumina fines, one or both of clay and bauxite, optionally one or more sintering aids, and optionally binder are ground to about 90-100% less than 325 mesh. According to certain embodiments, one or both of the clay and bauxite is calcined, and if present, the binder is starch. Ninety weight percent of the ground starting ingredients are added to a high intensity mixer.

2. The starting ingredients are stirred using a suitable commercially available stirring or mixing devices have a rotatable horizontal or inclined circular table and a rotatable impacting impeller.

3. While the mixture is being stirred, sufficient water is added to cause formation of spherical pellets and growth of those pellets to the desired size.

In general, the total quantity of water which is sufficient to cause essentially spherical pellets to form is from about 17 to about 23 percent by weight of the starting ingredients. The total mixing time usually is from about 2 to about 15 minutes.

After the mixture of alumina fines, at least one of clay and bauxite, optionally one or more sintering aids and optionally binder has grown into spherical pellets of the desired size, the mixer speed is reduced, and 10 weight percent of the ground starting ingredients is added to the mixer.

4. The resulting pellets are dried and screened to a specified size that will compensate for the shrinkage that occurs during sintering in the kiln. The pellets are screened for size preferably after drying. The rejected oversized and undersized pellets and powdered material obtained after the drying and screening steps may be recycled.

5. The dried pellets are then fired at sintering temperature for a period sufficient to enable recovery of sintered, spherical pellets having an apparent specific gravity of between 2.70 and 3.75 and a bulk density of from about 1.35 to about 2.15 g/cm$^3$. The specific time and temperature to be employed is dependent on the starting ingredients and is determined empirically according to the results of physical testing of pellets after firing.

Pellets may also be screened after firing. The finished pellets may be tumbled to enhance smoothness. The proppant of the present embodiments generally has a particle size distribution that meets the API designation for 20/40 proppant which specifies that the product must retain 90% between the primary 20 and 40 mesh sieves. However, other sizes of proppant ranging from 140 mesh to 6 mesh may be produced with the same mixture. The proppant prepared according to the present embodiments demonstrates the following typical sieve analysis (weight % retained):

| U.S. Mesh | Microns | 20/40 |
| --- | --- | --- |
| +16 | +1180 | 0 |
| −16 + 20 | −1000 + 850 | 3 |
| −20 + 30 | −850 + 600 | 69 |
| −30 + 40 | −600 + 425 | 27 |
| −40 | −425 | 0 |

The bulk density values reported in Table I were determined by weighing that amount of sample that would fill a cup of known volume utilizing procedure ANSI B74.4.

The crush values reported in Table I were obtained using the American Petroleum Institute (API) procedure for determining resistance to crushing. According to this procedure, a bed of about 6 mm depth of sample to be tested is placed in a hollow cylindrical cell. A piston is inserted in the cell. Thereafter, a load is applied to the sample via the piston. One minute is taken to reach maximum load which is then held for two minutes. The load is thereafter removed, the sample removed from the cell, and screened to separate crushed material. The results are reported as a percentage crushed to a size smaller than the starting material by weight of the original sample (e.g. for a 20/40 material it would be the material that was crushed to −40 mesh).

In Table I is summarized the composition of the present embodiments for pellets produced from the raw materials indicated. Also given are the results of testing of these pellets. All samples were prepared in accord with the procedures described herein. Examples 1-4 give details regarding the procedure employed in the preparation of the proppant samples the testing of which is reported in Table I.

The chemistries for the mixtures were calculated from the blending ratios of raw materials and the chemistries of the raw materials as measured by inductively coupled plasma (ICP) which is an analytical method known to those of ordinary skill in the art.

TABLE I

| | Alumina Fines | Alumina/ Kaolin (58:42) | Alumina/Kaolin/ Iron Oxide (64:28:8) | Alumina/Bauxite/ ZnO (36:63:1) | Alumina/Bauxite (20:80) |
| --- | --- | --- | --- | --- | --- |
| Chemistry | | | | | |
| $Al_2O_3$ | 98.77 | 77.18 | 77.96 | 89.8 | 85.6 |
| $Fe_2O_3$ | 0.03 | 0.43 | 7.95 | 0.7 | 5.4 |
| $K_2O$ | 0 | 0.04 | 0.02 | 0.1 | 0.01 |
| $SiO_2$ | 0.08 | 21.31 | 12.57 | 4.9 | 5.7 |
| CaO | 0.04 | 0.1 | 0.09 | 0.2 | 0.02 |
| NaO | 1.07 | N/A | 0.74 | 0.4 | 0.2 |
| MgO | 0 | 0.04 | 0.02 | 0.1 | 0.02 |
| $P_2O_5$ | 0 | 0.04 | 0.01 | 0.1 | 0.01 |
| $TiO_2$ | 0 | 0.86 | 0.57 | 2.4 | 2.9 |
| ZnO | 0 | 0 | 0 | 1.0 | 0 |
| LOI | 15.6 | 13.4 | 12.4 | 14.9 | 4.2 |
| 20/40 Properties | | | | | |
| BD | | 1.34 | 1.84 | 1.99 | 1.98 |
| ASG | | N/A | 3.3 | 3.65 | 3.63 |
| 15,000 psi % crush | | | | 7.4 | 2.9 |
| 10,000 psi % crush | | | 2.9 | | |
| 4,000 psi % crush | | 2.1 | | | |
| Sphericity | | >0.8 | >0.8 | >0.8 | >0.8 |

EXAMPLE 1

A 58/42 ratio mixture of alumina fines and calcined kaolin clay was prepared by first grinding the mixture so that 99.4% of the mixture had a particle size of less than 325 mesh. Next, about 3200 grams of the 58/42 ratio mixture was charged to an R02 Eirich mixer.

The mixer was operated on high speed rotor and 1050 grams of water containing 24 grams of starch as a binding agent was added. Pelletizing was continued at high speed rotor for 4.5 minutes. Next, the speed of the mixer was reduced to "slow" rotor and 200 grams of polishing dust having the same 58/42 ratio composition of alumina fines and calcined kaolin clay was added. The pellets were polished under slow rotor for a total of 1.5 minutes.

The pellets were then dried and screened to −16 mesh/+30 mesh prior to firing at temperatures ranging from 2850 to 3000° F. The resulting pellets had a bulk density of 1.34 gm/cm$^3$.

The crush strength of the pellets was tested in accordance with the API procedure for determining resistance to crushing noted above and at an induced pressure of 4,000 psi the pellets had a crush percentage of 2.1. The best strength was obtained at firing temperatures of 3000° F. which was the maximum temperature capability of the laboratory furnace. The data indicate that firing the pellets from this blend at higher temperatures would generate pellets with optimum strength.

EXAMPLE 2

About 3200 grams of a 64/28/8 ratio mixture of alumina fines, calcined kaolin clay, and iron oxide having a particle size of 98.6%<325 mesh were added to an R02 Eirich mixer.

The mixer was operated on high speed rotor and 750 grams of water containing 24 grams starch binder which is commercially available under the trade name Staramic 100 from Tate and Lyle North America was added. Rotation of the table and impeller was continued for about 10.5 minutes; subsequently, the impeller speed was decreased and 200 grams of polishing dust having the same 64/28/8 ratio composition of alumina fines, calcined kaolin clay and iron oxide was added incrementally. Polishing continued for approximately 2 minutes.

The pellets were then dried and screened to −16 mesh/+30 mesh prior to firing at about 2,750° F. The resulting pellets had an apparent specific gravity of about 3.30, a bulk density of 1.84 gm/cm$^3$ and a sphericity of greater than 0.8, as determined using the Krumbein and Sloss chart.

The crush strength of the pellets was tested in accordance with the API procedure for determining resistance to crushing noted above and at an induced pressure of 10,000 psi the pellets had a crush percentage of 2.9 which meets the API specification of 10% maximum crush for this size proppant.

EXAMPLE 3

About 4.5 kilograms of a 36/63/1 ratio mixture of alumina fines, bauxite, and zinc oxide having a particle size of 99.9%<325 mesh were added to an R02 Eirich mixer.

The mixer was operated on high rotor speed and about 1000 grams of water was added. Rotation of the table and impeller was continued for about 6 minutes; subsequently, the impeller speed was decreased and about 450 grams of polishing dust having the same 36/63/1 ratio composition of alumina fines, bauxite, and zinc oxide was added incrementally. Polishing continued for approximately 1 minute.

The pellets were then dried and screened to −16 mesh/+30 mesh prior to firing at about 2,840° F. The resulting pellets had an apparent specific gravity of about 3.65, a bulk density of 1.99 gm/cm$^3$ and a sphericity of greater than 0.8, as determined using the Krumbein and Sloss chart.

The crush strength of the pellets was tested in accordance with the API procedure for determining resistance to crushing noted above and at an induced pressure of 15,000 psi the pellets had a crush percentage of 7.4 which meets the API specification of 10% maximum crush for this size proppant.

EXAMPLE 4

About 3.6 kilograms of a 20/80 ratio mixture of alumina fines and bauxite having a particle size of 99.9%<325 mesh were added to an R02 Eirich mixer.

The mixer was operated on high rotor speed and about 800 grams of water was added. Rotation of the table and impeller was continued for about 6 minutes; subsequently, the impeller speed was decreased and about 360 grams of polishing dust having the same 20/80 ratio composition of alumina fines and bauxite was added incrementally. Polishing continued for approximately 1 minute.

The pellets were then dried and screened to −16 mesh/+30 mesh prior to firing at about 2,750° F. The resulting pellets had an apparent specific gravity of about 3.63, a bulk density of 1.98 gm/cm3 and a sphericity of greater than 0.8, as determined using the Krumbein and Sloss chart.

The crush strength of the pellets was tested in accordance with the API procedure for determining resistance to crushing noted above and at an induced pressure of 15,000 psi the pellets had a crush percentage of 2.9 which meets the API specification of 10% maximum crush for this size proppant.

The spherical, sintered pellets of the present invention are useful as a propping agent in methods of fracturing subterranean formations to increase the permeability thereof, particularly those formations having a compaction pressure of up to about 15,000 psi, which are typically located at depths of up to about 20,000 feet.

When used as a propping agent, the pellets of the present invention may be handled in the same manner as other propping agents. The pellets may be delivered to the well site in bags or in bulk form along with the other materials used in fracturing treatment. Conventional equipment and techniques may be used to place the spherical pellets as propping agent.

A viscous fluid, frequently referred to as "pad", is injected into the well at a rate and pressure to initiate and propagate a fracture in the subterranean formation. The fracturing fluid may be an oil base, water base, acid, emulsion, foam, or any other fluid. Injection of the fracturing fluid is continued until a fracture of sufficient geometry is obtained to permit placement of the propping pellets. Thereafter, pellets as hereinbefore described are placed in the fracture by injecting into the fracture a fluid into which the pellets have previously been introduced and suspended. The propping distribution is usually, but not necessarily, a multi-layer pack. Following placement of the pellets, the well is shut-in for a time sufficient to permit the pressure in the fracture to bleed off into the formation. This causes the fracture to close and apply pressure on the propping pellets which resist further closure of the fracture.

In addition, the spherical, sintered pellets of the present invention are useful as grinding media. When used as grinding media, the pellets are nearly white or pale tan in color, a desirable property for media used in mineral grinding or other types of grinding where color of the ground product is a critical quality parameter. When the spherical, sintered pellets of the present invention eventually wear during use, they do not produce discoloration in the product as is found with metal media or dark-colored ceramic media.

The foregoing description and embodiments are intended to illustrate the invention without limiting it thereby. It will be understood that various modifications can be made in the invention without departing from the spirit or scope thereof.

What is claimed is:

1. A method for making a gas and oil well proppant comprising a plurality of sintered, spherical pellets comprising preparing a composition comprising from about 58 to about 75 percent by weight of alumina fines and from about 25 to about 42 percent by weight of clay, wherein the alumina fines has an alumina content of about 99 percent by weight.

2. The method of claim 1 wherein the composition further comprises at least one sintering aid.

3. The method of claim 2, wherein the at least one sintering aid is selected from the group consisting of iron oxide, zinc oxide, bentonite clay, feldspar, nepheline syenite, talc, titanium oxide, lithium carbonate, sodium oxide, sodium carbonate, sodium silicates, magnesium oxide, magnesium carbonate, calcium oxide, calcium carbonate, manganese oxide, boric acid, boron carbide, aluminum diboride, boron nitride and boron phosphide.

4. The method of claim 2, wherein the composition comprises from about 0.1 to about 15 percent by weight of the at least one sintering aid.

5. The method of claim 2, wherein the composition comprises from about 1 to about 8 percent by weight of the at least one sintering aid.

6. The method of claim 1, wherein the composition comprises kaolin clay.

7. The method of claim 1, wherein the composition comprises calcined kaolin clay.

8. The method of claim 1, wherein the composition comprises 58 percent by weight of alumina fines and 42 percent by weight of clay.

9. The method of claim 2, wherein the composition comprises 64 percent by weight of alumina fines, 28 percent by weight of clay and 8 percent by weight of the at least one sintering aid.

10. The method of claim 9, wherein the at least one sintering aid comprises iron oxide.

11. The method of claim 1, wherein the pellets have an apparent specific gravity of from about 2.70 to about 3.75.

12. The method of claim 1, wherein the pellets have a bulk density of from about 1.35 to about 2.15 g/cm$^3$.

13. A method for making a gas and oil well proppant comprising a plurality of sintered, spherical pellets comprising preparing a composition comprising from about 20 to about 36 percent by weight of alumina fines and from about 63 to about 80 percent by weight of bauxite, wherein the alumina fines has an alumina content of about 99 percent by weight.

14. The method of claim 13, wherein the composition comprises 36 percent by weight of alumina fines, 63 percent by weight of bauxite and 1 percent by weight of the at least one sintering aid.

15. The method of claim 13, wherein the composition comprises 20 percent by weight of alumina fines and 80 percent by weight of bauxite.

* * * * *